Oct. 22, 1929.  J. WEGNER  1,732,704
CUTTING MACHINE
Filed Sept. 30, 1927    3 Sheets-Sheet 2
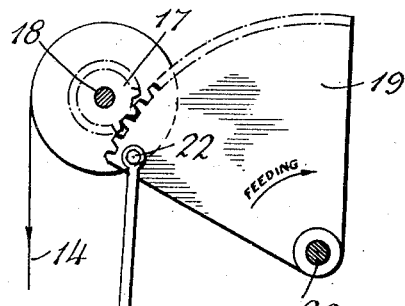
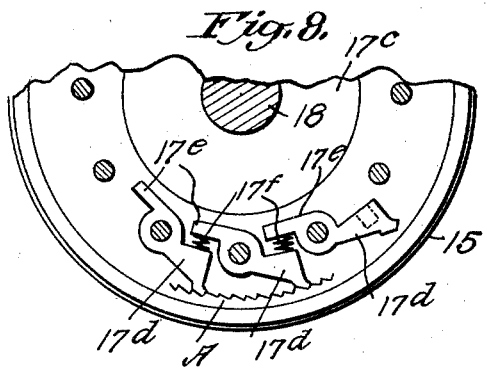
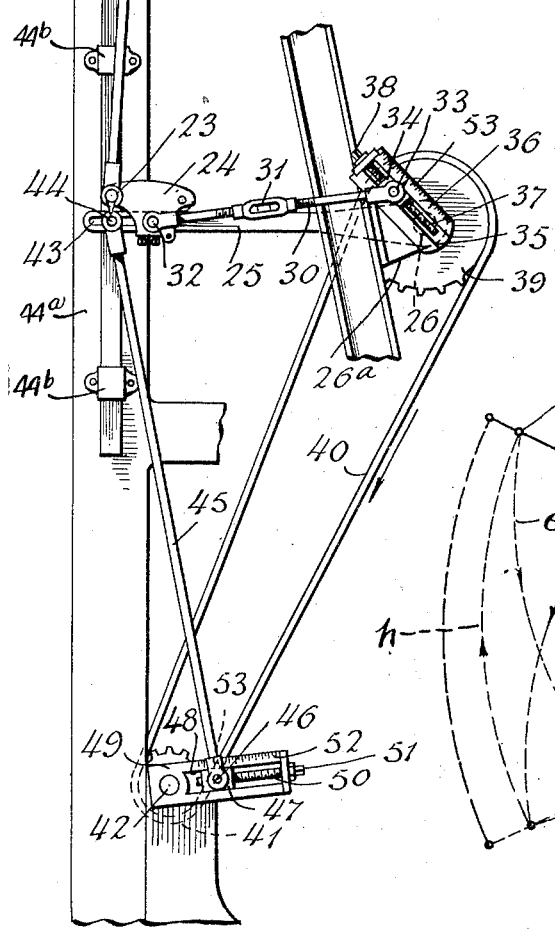
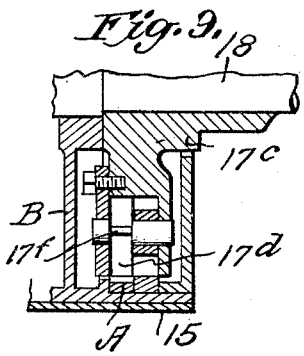
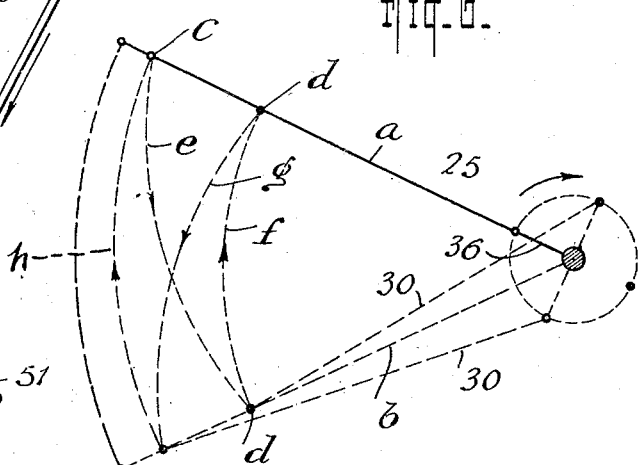
INVENTOR
JULIUS WEGNER
BY
ATTORNEYS

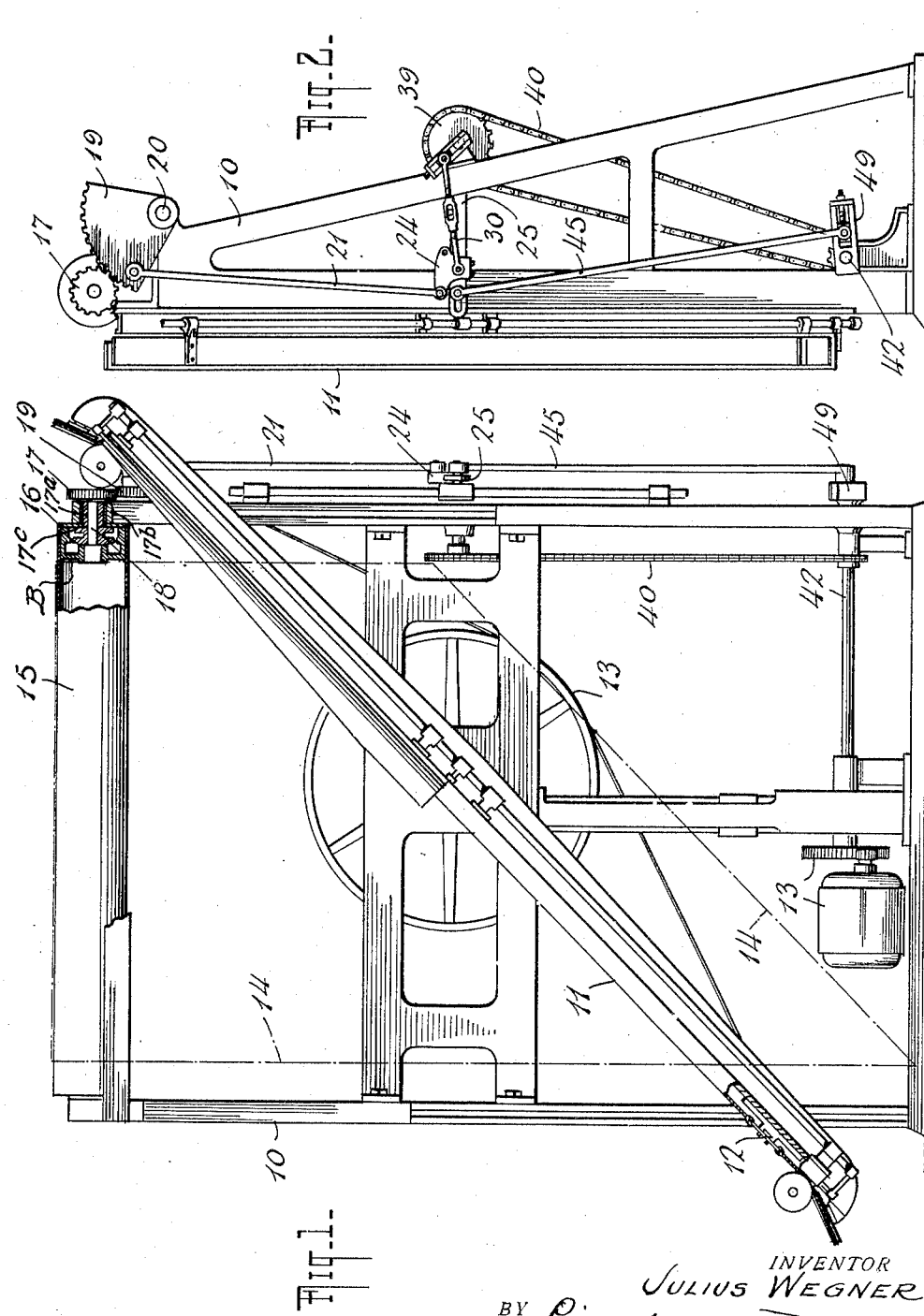

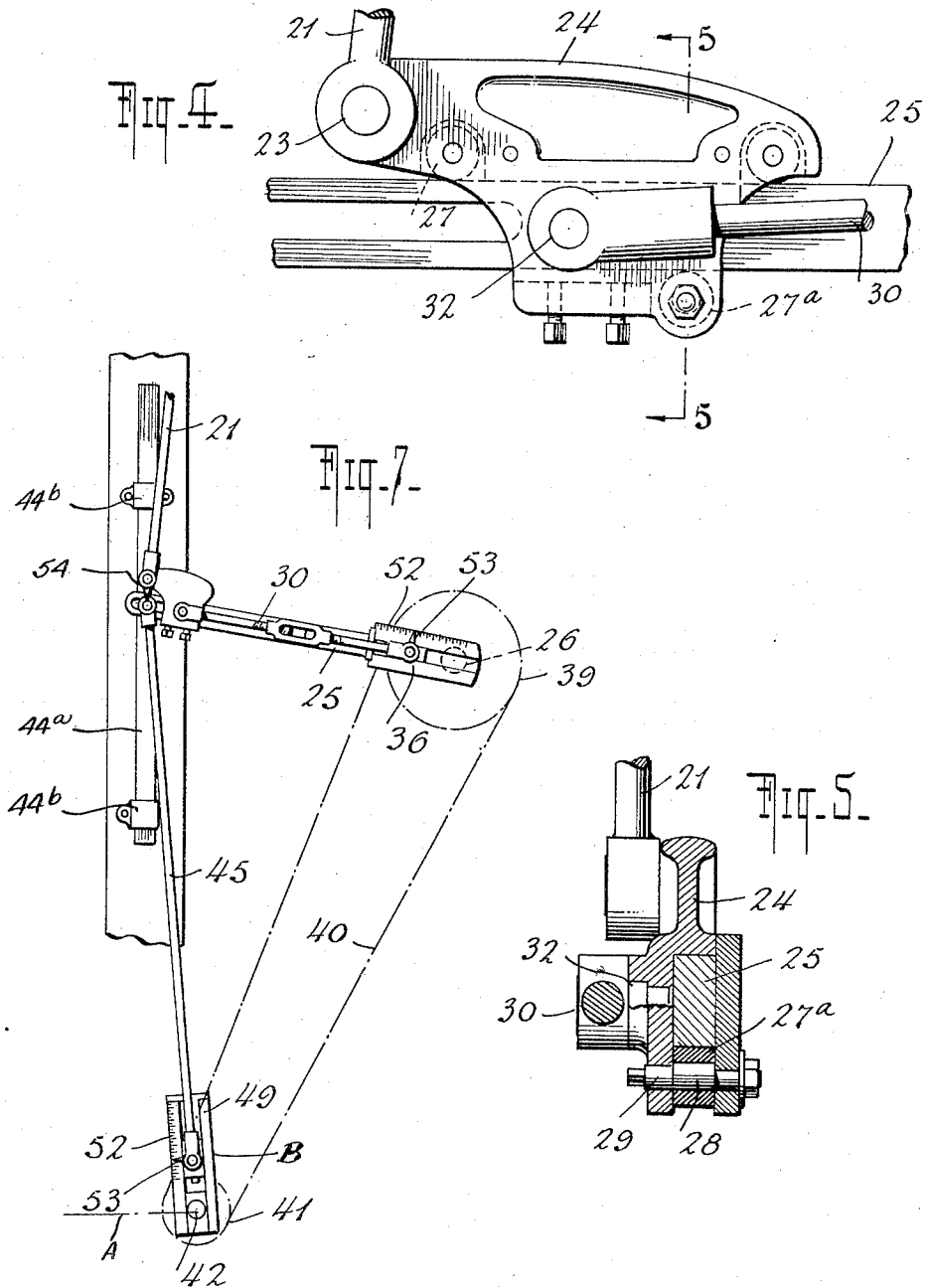

Patented Oct. 22, 1929

1,732,704

UNITED STATES PATENT OFFICE

JULIUS WEGNER, OF ASTORIA, NEW YORK, ASSIGNOR TO SPADONE MACHINE COMPANY, INC., OF NEW YORK, N. Y., A CORPORATION OF NEW YORK

CUTTING MACHINE

Application filed September 30, 1927. Serial No. 223,044.

The invention relates to cutting machines and more particularly to machines for transversely cutting a web of material, preferably on the bias, into successive sections. In such machines provision is made for feeding the web of material in successive steps into cutting relation to the cutting mechanism, provided for the purpose of transversely cutting the fabric. Heretofore it has been the practice to feed the material in steps which are uniform, so that successive sections of the material cut from the web, are all of the same dimensions; an example of a cutting machine of the kind in question is found in my United States Patent No. 1,384,984 of July 19, 1921.

The object of the instant invention is to provide machines of the indicated class, with novel and simple mechanism, whereby the feed of the web of material may be automatically varied to produce cut sections of different dimensions, without interfering with the continuity of operation of the machine. Other more specific objects will appear from the description hereinafter and the features of novelty will be pointed out in the claims.

In the accompanying drawings, which show an example of the invention without defining its limits, Fig. 1 is a front elevation of a cutting machine with the improvements embodied therein; Fig. 2 is a side elevation thereof; Fig. 3 is a diagrammatic view illustrating the novel mechanism independently of the cutting machine; Fig. 4 is a fragmentary detail view of a portion of the cut-adjusting mechanism; Fig. 5 is a section on the line 5—5 of Fig. 4; Fig. 6 is a diagram illustrating the operation of the mechanism; Fig. 7 is a diagram showing the method of setting the machine; Fig. 8 is a fragmentary section illustrating an example of a feeding means included in the machine, and Fig. 9 is a fragmentary cross-section thereof.

The cutting machine, in general, may be of any suitable or conventional construction and in all of its forms includes a cutting mechanism, and a feeding mechanism whereby a web of material is fed in successive steps to said cutting mechanism, the latter being operated to cut said web transversely, and preferably on the bias, into successive sections. As the cutting machine itself, and the cutting mechanism per se forms no part of the instant invention, only so much of said machine and said cutting mechanism has been shown, as is required to clearly set forth the arrangement and operation of the novel features. As shown in the illustrated example, the cutting machine comprises a main frame 10 on which is mounted a raceway 11, which, if desired, may be adjustable as to its angle of inclination. A suitable cutting device 12 is slidably mounted in said raceway 11 and is reciprocated therein by means of conventional driving mechanism 13, said cutting device being so constructed and operated that its movement in one direction constitutes an operative cutting stroke, while its movement in the opposite direction comprises an inoperative movement of recovery during which the web of material 14 is fed to the next cutting position.

In the illustrated example the means whereby the web of material 14 is fed to the cutting device 12, includes a roller 15 journalled on the frame 10 at the upper portion thereof, said web 14 passing from a suitable source of supply over the roller 15 and depending therefrom in operative relation to the cutting device 12. Suitable provision is made in the machine for clamping the web 14 in position adjacent to the cutting device 12, while the cut is being made thereby. The feeding means shown in the form of machine illustrated further comprises a pawl and ratchet mechanism operatively connected with the roller 15 so as to rotatively feed the latter during one step in the operation of the feeding means and so as to describe a return movement of recovery relatively to said roller 15, which during such return movement accordingly remains stationary. The aforesaid pawl and ratchet mechanism may be of any suitable and conventional form, and as shown in Figs. 8 and 9, may consist of a pinion 17 secured upon a sleeve 17$^a$ which is journalled in a suitable bearing 17$^b$ forming part of or secured to the frame 10. The sleeve 17$^a$ forms part of a ratchet disk 17$^c$ which carries a plurality of pivotally mounted pawls 17ᵈ each of which includes a projection 17ᵉ extending rearwardly over the next adjacent pawl, and acted upon by a spring 17ᶠ in a manner tending to swing each pawl outwardly. The pawls 17ᵈ co-operate with a ratchet ring A secured within an end plug B which is fastened within the one end of the roller 15 and fixed upon a stub shaft 18 extending through and journalled in the sleeve 17ª and suitably held therein against relative axial movement. The pinion 17 is arranged in mesh with a segment 19 pivotally mounted at 20 on the frame 10 and rocked at the proper time to rotate the aforesaid mechanism and the roller 15 to thereby advance the web 14 in a feeding step, and shifted in a return movement of recovery during which the web 14 remains stationary and the cut is made; the extent to which the segment 19 is rocked during its operative movement determines the extent to which the roller 15 is actuated and the web 14 is fed and accordingly predetermines the distance between successive cuts and as a consequence the dimensions of the sections which are cut from said web. As has been previously stated, it has heretofore been the custom to construct the machines of the indicated type in such a manner that the web 14 is fed in successive steps which are uniform, so that the sections cut from the web 14 are all of the same dimensions. It is sometimes required however to provide cut sections of the web 14 which are of different dimensions and the following mechanism is provided for the purpose of varying successive feeding steps of the web in a manner to produce cut sections of the web of material which are of varying dimensions between their cut edges, without interrupting the continuity of operation of the machine as a whole. In the illustrated example the novel arrangement is such that alternately wide and narrow sections will be cut from the web; it will be obvious from the description hereinafter that this arrangement may be changed to provide any desired sequence in the variation of the feed to thereby produce cut sections which successively differ from each other, otherwise than as indicated above.

In the form chosen for the purpose of illustrating and describing the novel features, the aforesaid mechanism comprises a rod 21 having its one end pivotally connected at 22 with said segment 19 as shown in Fig. 2. The other end of said rod 21 is pivotally connected at 23 with a slide block 24 slidably mounted upon a rocking or oscillating arm or actuating member 25 pivoted at 26 upon a suitable bracket 26ª secured to the frame 10 at the proper point. To facilitate the movement of the slide block 24 along the arm 25, for the purpose to be more fully set forth hereinafter, rollers 27 and 27ª may be journalled upon said block 24 in rolling engagement with the opposite edge surfaces of said arm as shown in Figs. 4 and 5; in order to provide for play adjustment of said rollers 27 and 27ª, the latter may rotate upon a bearing member 28 which is eccentrically mounted on a pin 29 adjustably supported in the block 24. Obviously as the pin 29 is rotated about its axis, the bearing member 28 will be adjusted to shift the roller 27ª toward or away from the one edge of the arm 25, as will be obvious. A two-part connecting rod 30 adjustable as to length by means of a turn buckle 31 or its equivalent, has its one end pivotally connected at 32 with the slide block 24, and its other end pivotally connected at 33 with a pivot block 34 slidably adjustable in the slot 35 of a differential crank member 36, mounted by means of the bracket 26ª upon the frame 10 so as to be movable relatively to the arm 25 about an axis coincidental with the pivotal axis of said arm. For the purpose of adjusting the pivot block 34 in the slot 35, an adjusting screw 37 is mounted on said crank member 36 in threaded engagement with the block 34 and is provided with a squared head 38 or its equivalent for the accommodation of a suitable tool, whereby the operation of said adjusting screw 37 is facilitated. The crank 36 is rotated about its axis, for instance, by means of a sprocket wheel 39 mounted to turn with said crank and connected through the medium of a sprocket chain 40 with a sprocket 41 fixed upon a drive shaft 42 which forms part of the aforesaid driving mechanism 13; in order to secure the desired operative relation between the parts, the sprockets 41 and 39 bear a certain predetermined speed ratio to each other which in the illustrated example is two to one.

At its free end the arm 25 is formed with a slot 43 in which a pivot 44 is movably mounted, said pivot 44 serving to pivotally connect the arm 25 with one end of a second rod 45, the other end of which is pivotally connected at 46 with a pivot block 47. The latter is mounted in the slot 48 of a main crank member 49 and is adjustable in said slot by means of an adjusting screw 50 carried by the crank member 49 and provided with a squared head 51 to accommodate a suitable tool for facilitating the operation of said adjusting screw 50. The crank member 49, as shown in Fig. 3, is secured upon the shaft 42 of the driving mechanism 13, so as to be rotatively operated thereby. In order to steady the operation of the mechanism, the pivot 44 may be connected with a slide 44ª mounted to reciprocate vertically in guide bearings 44ᵇ secured upon the frame 10 of the machine.

Each of the cranks 36 and 49 may be provided with suitable scales 52 arranged for co-operation with pointers 53 or their equivalent carried by the blocks 34 and 47 for visibly indicating the adjustments of the latter on the respective cranks 36 and 49. In addition, it is desirable to provide a pointer 54 upon the rod 21 contiguous to the pivot 23 thereof, to facilitate the setting of the machine, as will appear more fully hereinafter.

In practice, with the machine constructed and arranged as in the illustrated example, the web 14 is fed downwardly to the cutting mechanism by the rotation of the roller in successive steps through the medium of the aforesaid feeding mechanism, and while the web is stationary and temporarily clamped in place, the cutting device 12 is actuated lengthwise of the raceway 11 to cut a section of said web therefrom, the cut section being removed in any convenient manner. It will be obvious that as the segment 19 is rocked in one direction the pawls 17$^d$ in co-operation with the teeth of the ratchet ring A will rotate the roller 15 in a direction to feed the web 14 downwardly, and that when said segment 19 is rocked in the opposite direction the pawls 17$^d$ will ride over said teeth in movements of recovery during which the roller 15 and consequently the web 14 is stationary; during these periods of rest the web 14 is clamped in position and cut as hereinbefore set forth. As the web 14 is again fed downwardly by the roller 15, the cutting device is shifted lengthwise of the raceway 11 in the opposite direction, in a movement of recovery, these operative steps being repeated in sequence throughout any given period of operation of the machine, and serving to cut said web 14 into successive sections as the operation proceeds. With the mechanism adjusted in the manner illustrated in the drawings, these operations will produce alternate cut sections of material of different widths between the cut edges. This is accomplished in the following manner: Assuming the parts to be in the position illustrated diagrammatically in Fig. 6, an actuation of the crank member 49 by the shaft 42 will exert a downward pull upon the arm 25 and will pivotally swing said arm from the full line position $a$ to the dotted line position $b$. During this operation, the crank member 36 is caused to rotate about its axis through the medium of the sprockets 41 and 39 and the sprocket chain 40, at a speed which is half as fast as that of the crank member 49. The crank member 36 will accordingly exert a pull upon the connecting rod 30 and as a result will shift the slide block 24 lengthwise of the arm 25 from the postion $c$ to the position $d$, the block 24 being in the latter position when the arm 25 reaches the position $b$ and traversing the path indicated by the dotted line $e$ during the time the arm 25 travels from postion $a$ to position $b$. During these operative steps just described, the cutting device 12 has effected a cut across the web 14. As the operation continues the crank member 49 will now exert an upward push on the arm 25 and the latter will be swung back from the position $b$ to the position $a$ during which the block 24 traverses the path indicated by the dotted line $f$ and during which a feeding of the web 14 relatively to the cutting mechanism takes place. As the next step, the arm 25 again swings from the position $a$ to the position $b$ and the crank member 36 develops a pushing force upon the connecting rod 30 whereby the block 24 is shifted lengthwise of the arm 25 from the position $d$ back to the position $c$, said block, during this operative step describing a path indicated by the dotted line $g$. During this operative step, in which the shifting of the block 24 takes place, the cutting device 12 has effected another cut to produce a web section, which for the descriptive purposes, is designated a narrow section. As the arm 25 now again swings from the position $b$ to the position $a$ the block 24 will pass over the path indicated by the dotted line $h$, and the web 14 is caused to advance another step which is greater in extent than the previous advance of said web. As a result the next cut of the cutting device 12 will produce a web section, which is wider between its cut edges than the previous cut section, and for descriptive purposes is referred to as a wide section.

As the swinging movements of the arm 25 are transmitted to the rod 21 alternately as pulling and pushing forces, it will be obvious that the segment 19 will be correspondingly rocked on its pivot 20 and that the feed roller 15 will be rotated in successive steps at spaced intervals. Because of the fact that the pivotal connection between the rod 21 and the arm 25 is alternately shifted nearer to and farther away from the pivot of the arm 25, it follows that the extent of rotation of the roller 15 and consequently the feed of the web 14, will take place in subsequent steps which differ from each other in extent, as exemplified by the arcs $f$ and $h$, the former being shorter than the latter. The cutting machine will thus automatically and alternately cut narrow and wide sections from the web 14 without in any way interfering with the continuity of operation of the machine.

The illustrated example of the novel device may be adjusted to vary the differences in the distances between cuts so as to produce cut sections of many different dimensions. After the dimensions of the sections which are to be cut have been predetermined, the machine is set in the following manner: The main crank member 49 is first adjusted to "position A" in Fig. 7, after which the block 47 is shifted in the slot 48 to a position in which the pointer 53 registers with the designation on the scale 52 corresponding to the largest width which is desired in the cut sections, and locked in this position. The main crank member 49 is then brought to "position B" in Fig. 7, that is to a position in which the pivot 46 is in its extreme upper position with respect to the shaft 42. When this has been done, the differential crank member 36 will occupy the position shown in Fig. 7, and the block 34 is adjusted in the slot 35 thereof to bring the pointer 53 into registry with the designation on the scale 52 which corresponds to the narrower width of cut sections which is desired, and secured in place. The turn buckle 31 is then operated to adjust the connecting rod 30 in a manner to bring the pointer 54 into line with the centre of the pivot 44. The machine is now ready for operation and will automatically cut alternate wide and narrow sections from the web 14 in accordance with the dimensions decided upon or required, the arrangement being such that the slide block 24, or more specifically its point 23, always starts its motion from a common point and to return thereto.

The machine may be used for cutting successive web sections of equal dimensions, by locking the slide block 24 in the position shown in Fig. 3, means, such as a set screw, being included in the construction to make this possible, and fixing the block 34 in registry with the axis of rotation of the differential crank member 36. With such adjustment of the parts, the swinging movements of the arm 25 will have no effect other than to operatively connect the rods 21 and 45, and the latter will operate as a single connection between the main crank member 49 and segment 19, and will simply cause the latter to be rocked by said crank member 49 to the full extent developed by the main crank member 49.

In any case the main crank member 49 and its associated elements comprises an operating unit whereby the operation of the feeding device, exemplified in the illustrated example by the feed roller 15, is controlled, while the arm 25 with its co-operating elements constitutes a transmitting unit connected with said operating unit; the differential crank member 36 and the slide block 24 with the parts operatively connected therewith acts as a means for automatically adjusting the transmitting unit to vary the operative effect of the operating unit on said feeding device, or more specifically to increase and decrease the extent of the feeding steps developed by the feeding device, in alternate sequence, without interrupting the continuity of operation of the machine.

The improvements are applicable to machines for cutting fabrics, friction duck for use in the production of tires, hose and the like, and for cutting webs of other materials, and are particularly designed for use in machines for cutting webs of material on the bias. The mechanism is of maximum simplicity and requires no particular skill either in its operation or adjustment, and provides an efficient means for cutting the aforesaid webs of materials into sections which differ from each other in dimensions, as well as into sections which are alike as to size.

While the illustrated form of the invention shows an arrangement in which the variable feed is such as to produce relatively wide and narrow cut sections, in alternate sequence, it will be understood that the generic feature of the invention is to produce successive cut sections, some of which differ from others as regard the distance between their cut edges. For instance, the feed of the web may be such as to produce a plurality of cut sections of the same dimensions in succession, followed by either one or more cut sections of different dimensions, or to produce one or more cut sections of given dimensions and then a plurality of successive sections having dimensions differing from said one or more sections and either corresponding to or differing from each other, or the successive cut sections may be of more than two different dimensions between the cut edges.

Various changes in the specific form shown and described may be made within the scope of the claims, without departing from the spirit of the invention.

I claim:

1. In a cutting machine of the kind described, the combination of a feeding device for feeding a web of material in successive steps, operating means controlling the operation of said feeding device and adjustable to vary its operative effect on said device, a rocking member connected with said operating means, a connection from said member to said feeding device, and means whereby said connection is automatically adjusted toward and away from the pivot of said rocking member to transmit the operative effect of said operating means directly to said feeding device and in varying degrees whereby the extent of feed of the web is varied in predetermined sequence.

2. In a cutting machine of the kind described, the combination of a feeding device for feeding a web of material in successive steps, a rotating main crank member, a rocking arm, a rod connected at one end with said arm and adjustably connected at its other end with said main crank member, a slide block carried by said arm and slidably lengthwise thereof, a connection from said slide block to said feeding device whereby the throw of said arm is transmitted to the feeding device, and a rotating differential crank member connected with said slide block for automatically adjusting the latter lengthwise of said arm during the rocking thereof whereby the throw of said arm effective upon the connection between said slide block and feeding device is varied and the extent of feed of said web is relatively increased and diminished in predetermined sequence.

3. In a cutting machine of the kind described, the combination of a feed roller for a web of material, pawl and ratchet mechanism for rotating said roller at spaced intervals to feed said web in successive steps, a pinion connected with said pawl and ratchet mechanism, a toothed segment in mesh with said pinion, a main crank member, a block adjustably mounted on said main crank member, a pivoted oscillating arm, a rod connected at one end with said arm and at its other end with the block of said main crank member, a slide block on said arm, a second rod pivotally connected with said slide block and said segment, a differential crank member having an axis of rotation coincident with the pivot of said arm, a block adjustably mounted on said differential crank member, and a connecting rod adjustable as to length and connected with the block of said differential crank member and with said slide block whereby the latter is automatically adjusted lengthwise of said arm for automatically varying the effective throw of said arm on said second rod and segment to vary the extent of rotation of said feed roller in successive steps and thereby increase and decrease the extent of feed of the web in predetermined sequence.

In testimony whereof I have hereunto set my hand.

JULIUS WEGNER.